J. UNDERKOFLER.
Truck.
No. 28,024.
Patented Apr 24, 1860.
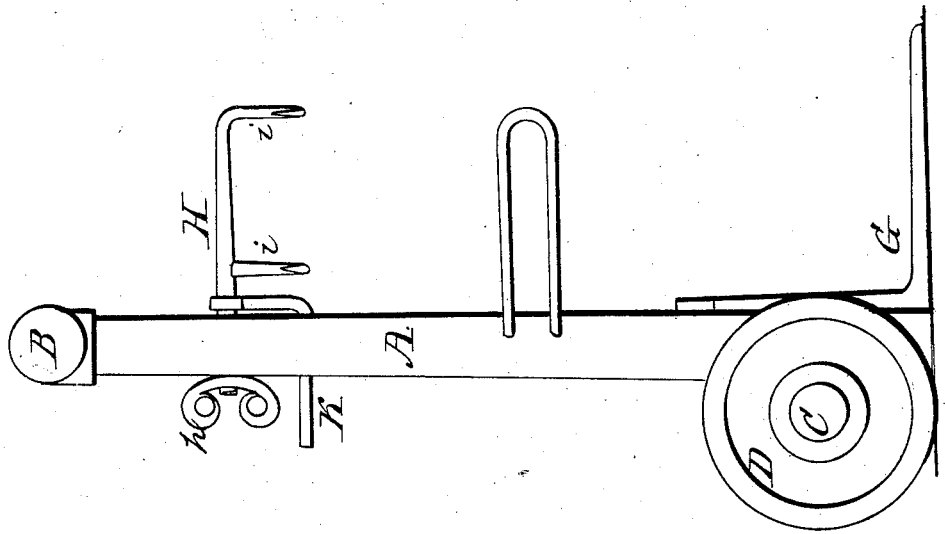
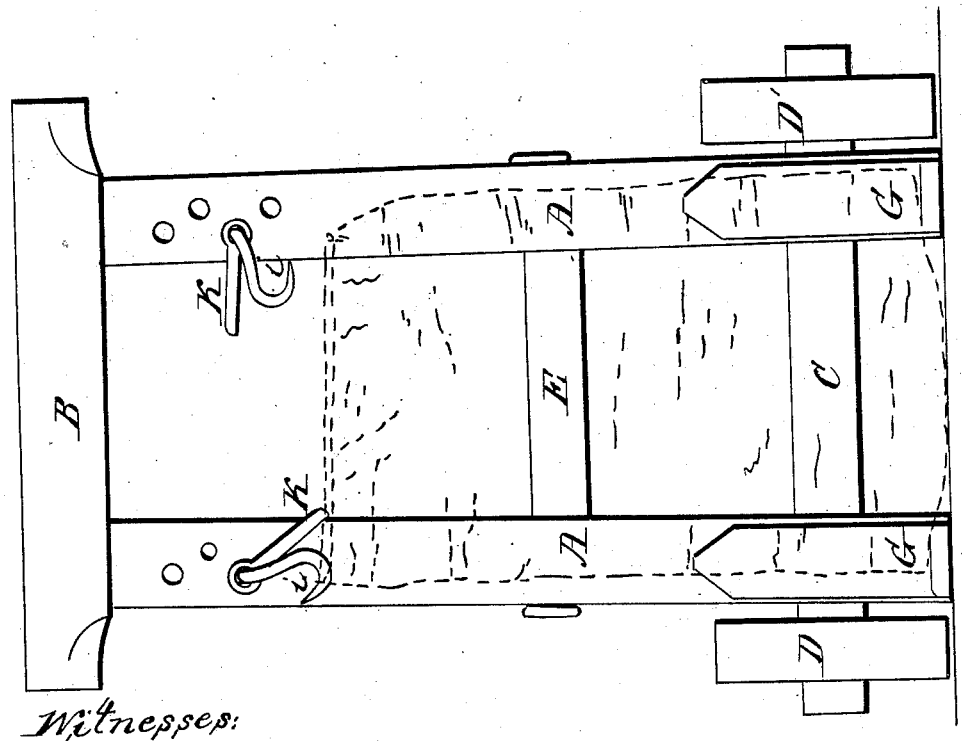
Witnesses:
Henry Howson
Horace See
Inventor:
Jonas Underkofler

UNITED STATES PATENT OFFICE.

JONAS UNDERKOFLER, OF PHILADELPHIA, PENNSYLVANIA.

HAND-TRUCK.

Specification of Letters Patent No. 28,024, dated April 24, 1860.

*To all whom it may concern:*

Be it known that I, JONAS UNDERKOFLER, of the city and county of Philadelphia and State of Pennsylvania, have invented a new and useful Improvement in Trucks; and I do hereby declare the following to be a full, clear, and exact description of the same, reference being had to the accompanying drawing and to the letters of reference marked thereon.

My invention consists in combining certain hooked rods and angular pieces with a truck substantially in the manner described hereafter, so that the whole may form a combined sack holder and truck for facilitating the removal of grain and other materials.

In order to enable others to make and use my invention, I will now proceed to describe its construction and operation.

On reference to the accompanying drawing which forms a part of this specification, Figure 1 is a rear view, and Fig. 2 a side view of my improved truck.

A and A′ are the vertical posts of the frame work and are connected together at the top by the cross bar B (which forms the handle of the truck), at the lower end by the axle C′ (to which are hung the two wheels D and D′) and at an intermediate point by a cross bar E.

To the lower end of each of the posts A and A′ is secured an angular piece of iron G. These pieces serve the double purpose of maintaining the frame of the truck in a vertical position with its wheels free from contact with the ground and of retaining the load on the truck when the latter is moved over the ground.

Near the upper end of each vertical post of the truck passes a rod H, furnished at the back of the post with a nut $h$, which retains the rod in its proper position but allows it to be turned freely when desired. Each rod is furnished with two hooks $i$, $i$ for catching hold of the sack, and with an arm K by means of which the rod is turned, and the bent end of which is arranged to catch against the inside of one of the posts. The upper edge of the sack which is shown in red lines in the drawing is connected to the hooks $i$, $i$ of both rods H, the hooks keeping the mouth of the sack distended while it receives its load, the bottom of the sack resting on the angular pieces G and the truck being in the upright position represented in Fig. 2.

When the sack has received the desired load, the rods H are turned by means of the bent arms K, so that the hooks $i$, $i$ are at once disconnected from the mouth of the sack which may now be tied, after which the truck is seized by the cross bar B, pulled down so that its wheels are brought into contact with the ground and the truck with its loaded sack moved to the desired locality.

It will be seen without further description that the above-described apparatus presents in one instrument, a truck and sack holder, and affords every facility for the rapid removal of grain and other materials.

I claim as my invention, and desire to secure by Letters Patent—

Combining the movable hooked rods H and the angular pieces G with the frame of the truck substantially in the manner and for the purpose herein set forth.

In testimony whereof, I have signed my name to this specification, in the presence of two subscribing witnesses.

JONAS UNDERKOFLER.

Witnesses:
CHARLES D. FREEMAN,
HENRY HOWSON.